Patented June 9, 1942

2,285,464

UNITED STATES PATENT OFFICE 2,285,464

PREPARATION OF PHOSPHORS

Robert F. Ruthruff, Nutley, N. J.

No Drawing. Application June 27, 1939,
Serial No. 281,351

16 Claims. (Cl. 23—135)

This invention relates to improvements in the manufacture of phosphors.

Phosphors may be defined as substances or compositions of matter that, following exposure to light, emit light or phosphoresce for an appreciable period even though the original light source has been removed. Fluorescent materials, on the other hand, are substances or compositions of matter that emit light only during the illumination period; these materials do not emit light after the original light source has been removed. While most phosphors fluoresce during the illumination period it is evident that by definition fluorescent materials do not phosphoresce.

A large number of phosphors have been described in the literature. Most phosphors are compositions of matter comprising three ingredients, (1) a phosphor base, (2) an activator, and (3) a colorless flux. As a rule, the phosphor bases comprise certain compounds of elements of the left hand sub-group of the first group of the periodic table and of both sub-groups of the second group of the periodic table. Generally, the phosphor bases in the strictly pure state do not exhibit phosphorescence. For the development of phosphorescent properties the phosphor bases are usually deliberately contaminated with traces of compounds of other elements which serve as activators. While in the art it is customary to speak of these activators as though they were elements, actually as a rule compounds of said elements are employed for the purpose. However, in the instant specification, the practice of the art will be followed for brevity and convenience. In addition, the phosphor base plus activator is usually encased in a colorless flux to form the phosphors of commerce.

As specific examples of known phosphor bases may be mentioned the sulfides, oxides, selenides and carbonates of sodium, rubidium, calcium, strontium, barium, beryllium, magnesium and zinc. Traces of iron, cobalt, nickel, copper, zinc, manganese, silver, tin, antimony, thallium, samarium, lead, bismuth or uranium have been used as activators for the above named phosphor bases. Other phosphor bases and phosphors that may be mentioned include sodium or potassium chloride activated with thallium, calcium tungstate, zinc phosphate, zinc silicate activated with manganese, zinc sulfide plus cadmium sulfide activated if desired with copper or silver and zinc borate activated with manganese.

The amount and character of the activator added to the phosphor base have a remarkable effect on the properties and utility of the resulting phosphor. In general, only traces of such activators are employed and usually the amount required for maximum effect is quite narrowly defined, the use of more or less than this optimum quantity resulting in an inferior product. With the calcium sulfide phosphor base for example, it has been found that about 0.00024 g. of bismuth per gram of phosphor base gives a very satisfactory product. The zinc sulfide phosphor base or the zinc sulfide-cadmium sulfide phosphor base is commonly activated with copper, manganese, silver or iron. When copper is employed, from 0.000006 g. to 0.0002 g. are used per gram of phosphor base, very good results being obtained with 0.00001 g. With manganese as activator up to 0.004 g. per gram of phosphor base is used while with silver some 0.00005 g. per gram of phosphor base is commonly employed. Very little iron is required to activate the zinc sulfide phosphor base or the zinc sulfide-cadmium sulfide phosphor base, from 0.000001 to 0.00004 g. per gram of phosphor base being used.

The effect of activators is quite specific and cannot be predicted and some very peculiar results have been observed. For example, a zinc sulfide phosphor containing 0.00005 g. silver per gram fluoresces brilliantly when exposed to light of a wave length in the visible or invisible region and phosphoresces after the light source is removed. On adding 0.000002 g. nickel per gram of zinc sulfide-silver mixture the phosphorescent properties are reduced greatly while the fluorescence is practically unaffected. If instead of nickel, 0.000001 g. iron per gram of zinc sulfide-silver mixture is added, the fluorescence is practically destroyed while the phosphorescence is largely unaffected. This ability to vary at will the fluorescent and phosphorescent properties of phosphors finds wide application in the manufacture of coating materials for X-ray viewing screens, television tubes and the like.

In general, in the manufacture of phosphors, the phosphor base is treated with an aqueous solution of a compound of the activating element, the desired flux is added and the whole is calcined. About 10% flux based on the phosphor base is used and such compounds as sodium sulfate, lithium carbonate, alkali chlorides, alkali fluorides, alkaline earth fluorides, borax and the like or mixtures thereof are employed. A calcining temperature of from 900° C. to 1100° C. is used in general, the mix being maintained at this level for a period of 15 to 30 minutes as a rule. During high temperature treatment changes other than the mere fusion of the flux occur. When a zinc sulfide phosphor base is used, during the calcining process a considerable part of the original sphalerite or amorphous form of zinc sulfide is transformed into the wurtzite modification. It is believed that zinc sulfide in the wurtzite crystal form is necessary for the development of phosphorescence.

One object of my invention is to provide improved method for the purification of substances used in the preparation of phosphor bases. Another object of my invention is to provide method for the direct production of phosphor bases in the crystal form required for the development of phosphorescence. A further object of my invention is to provide method for the direct production of activated phosphor bases in the crystal form required for the development of phosphorescence. Additional objects of my invention will become evident from the following description.

It is apparent that substances used in the preparation of phosphor bases must be of the highest purity. While the phosphor bases are usually activated by deliberate contamination with a foreign element or elements the amount and nature of the contaminant or contaminants must be under rigid control. For this reason it is necessary to prepare phosphor bases of the highest purity and then add a known amount of a known activator or activators. I have found that substances used in the preparation of phosphor bases may be conveniently purified, while in solution, by adding thereto a substantial amount of a compound capable of forming an insoluble, adsorptive precipitate of large specific surface, forming said precipitate and removing it, with its adsorbed impurities, from the solution. More specifically, zinc sulfate solution may be purified by first adding thereto about 10 mole percent or less of aluminum sulfate, following which ammonium hydroxide is added slowly, with stirring, until the precipitation of aluminum hydroxide is complete. The precipitate is removed from the solution by any suitable known means and the filtrate is then employed in the preparation of the desired phosphor base. The following examples describe in greater detail method for the purification of substances to be used in the preparation of phosphor bases. It is to be understood that these examples are illustrative only and in no way limit the scope of the instant invention.

*Example 1.*—To a solution containing 144 g. zinc sulfate per liter, in the form of the heptahydrate, is added anhydrous aluminum sulfate in an amount equal to 17 g. per liter. The mixture is stirred and half normal ammonium hydroxide is added slowly until the precipitation of the aluminum hydroxide is complete. The resulting slurry is filtered and the filtrate is employed in the preparation of zinc containing phosphor bases. If desired, prior to the addition of ammonium hydroxide, ammonium sulfate may be added to the solution in an amount equal to 34 g. per liter.

*Example 2.*—To a solution containing 101 g. per liter zinc sulfate heptahydrate, 42 g. per liter cadmium sulfate tetrahydrate and 34 g. per liter ammonium sulfate is added anhydrous aluminum sulfate in an amount equal to 8.5 g. per liter. The resulting mixture is stirred and half normal ammonium hydroxide is added slowly until the precipitation is complete. The resulting slurry is filtered and the filtrate is employed in the manufacture of zinc-cadmium containing phosphor bases. Instead of aluminum sulfate, chromium nitrate nonahydrate (10 g. per liter) may be employed.

*Example 3.*—A solution containing 93.5 g. beryllium nitrate trihydrate per liter is treated with activated metallic aluminum powder added at a rate of 3 g. per liter. The resulting suspension is stirred for several hours, preferably at elevated temperatures, following which the slurry is filtered and the filtrate is employed in the manufacture of beryllium containing phosphor bases. Preferably before adding the powdered activated metallic aluminum to the beryllium salt solution the latter is treated with sufficient ammonium hydroxide to give a barely perceptible permanent precipitate. The activated metallic aluminum powder may be made by first treating commercial aluminum powder with ether or a similar solvent to remove organic coating material commonly found thereon, following which the powder may, if desired, be lightly etched with dilute caustic followed by a water rinse. The powder is then superficially amalgamated by treating with an alcoholic or aqueous solution of a mercury salt, mercuric chloride for example. Or the clean metallic aluminum powder may be activated by forming thereon a superficial coating of a bimetallic couple on the surface of the individual particles by treating them with an aqueous or alcoholic solution of salts of copper, nickel, cobalt, zinc, iron and the like.

*Example 4.*—A solution is prepared containing 93.5 g. beryllium nitrate trihydrate per liter, 1.1 g. aluminum nitrate nonahydrate per liter and 100 g. ammonium acetate per liter. The pH is adjusted to 4.6 following which the solution is heated to the boil and one tenth its volume of a 3% tannin solution is added. The resulting reaction mixture is kept hot for an hour following which it is filtered, the filtrate being employed as usual in the preparation of beryllium containing phosphor bases.

*Example 5.*—To a stirred solution containing 128 g. magnesium nitrate hexahydrate per liter, 40 g. ammonium nitrate per liter and 37.5 g. aluminum nitrate nonahydrate per liter is added half normal ammonia until precipitation of aluminum hydroxide is complete. The resulting slurry is filtered and the filtrate is worked up as desired to form a magnesium containing phosphor base.

*Example 6.*—To a stirred solution containing 118 g. calcium nitrate tetrahydrate per liter and 37.5 g. aluminum nitrate nonahydrate per liter is added half normal ammonium hydroxide until precipitation of aluminum hydroxide is complete. The resulting slurry is worked up as desired to form a filtrate from which a calcium containing phosphor base can be made as usual.

*Example 7.*—Similar to Example 6, except that 42.5 g. per liter sodium nitrate replaces the hydrated calcium nitrate.

*Example 8.*—To an approximately half molar solution of a salt of an alkali metal, an alkaline earth metal or magnesium is added an aluminum salt in an amount sufficient to give a tenth molar solution or less with respect to this element. The mixture is then treated with sufficient dilute ammonium hydroxide to form a barely perceptible permanent precipitate, the solution is stirred and an ammonium sulfide solution is added slowly until precipitation of aluminum hydroxide is complete. The resulting slurry is filtered and the filtrate is used in the preparation of a phosphor base of an alkali metal, an alkaline earth metal or magnesium as the case may be.

Example 9.—A strong solution of zinc sulfate heptahydrate is treated with concentrated ammonia until the precipitate first formed has just dissolved. The solution is then diluted with water until the concentration of the salt is approximately half molar. The thus diluted solution is stirred and pulverized aluminum sulfide is added at a rate of 2.5 g. per liter of solution. The resulting slurry is filtered and the filtrate is used in the preparation of a zinc containing phosphor base.

Example 10.—To a solution containing 144 g. zinc sulfate heptahydrate per liter is added dilute ammonia until a barely perceptible permanent precipitate is present. The resulting reaction mixture is stirred and 2.5 g. per liter of pulverized aluminum sulfide is added slowly. After addition is complete the resulting slurry is filtered and the filtrate is employed in the preparation of a zinc containing phosphor base.

Example 11.—Similar to Example 10, above, except that 93.5 g. of beryllium nitrate trihydrate is substituted for the zinc sulfate.

It is obvious that where suitable the purified solutions made in accord with the above examples may be employed in the preparation of pigments instead of phosphor bases.

In general, phosphors may be made from solutions of compounds purified in accord with the above examples or by other method by converting the compounds into the desired phosphor bases, such as the sulfide, oxide, selenide, carbonate or the like, treating these with the requisite amount of a solution of a compound of an activating element, drying, adding a flux and calcining.

I have found that under certain circumstances and under suitable conditions it is possible to prepare a satisfactory phosphor without the use of a flux and without resorting to calcining. As has been mentioned previously herein, in the preparation of zinc sulfide phosphors the calcining step is necessary to convert the zinc sulfide from the amorphous form or from the crystal form known as sphalerite to the crystal form known as wurtzite. At ordinary temperatures wurtzite is a metastable form of zinc sulfide and accordingly when zinc sulfide is prepared at ordinary temperatures, sphalerite or amorphous zinc sulfide is obtained. On calcining, these are converted into wurtzite, the form stable at high temperatures and on cooling the calcined mass the wurtzite remains as such, existing in the metastable form.

By suitable and careful control of conditions it is possible to form wurtzite directly in the precipitation of zinc sulfide. To accomplish this desired result the precipitation must be conducted at moderately elevated temperatures which are closely defined and in the presence of a carefully controlled amount of acid. The precipitation reaction is conducted in the temperature range 250° C. to 350° C., preferably at about 300° C. An acid medium is necessary for the formation of wurtzite, but if the acidity is too high no precipitate forms due to the solubility of zinc sulfide in acid. The maximum permissible concentration of acid, expressed on the basis of percent sulfuric acid present, may be calculated for the above mentioned temperature range by means of the empirical equation:

$$\text{maximum \% } H_2SO_4 = 0.0225t - 2.75$$

where $t$ is temperature in degrees centigrade.

If acid concentration is too low, on the other hand, sphalerite or amorphous zinc sulfide forms. The minimum permissible concentration of acid, expressed on the basis of percent sulfuric acid present, may be calculated for the above mentioned temperature range by means of the empirical equation:

$$\text{minimum \% } H_2SO_4 = 0.04t - 8.8$$

where $t$ is temperature in degrees centigrade.

An examination of these two equations shows that both the maximum and minimum permissible amounts of acid increase with increasing temperature, the rate of increase with temperature of the minimum permissible amount of acid being the more rapid of the two so that the two curves intersect at about 350° C. The difference between the maximum and minimum permissible acid concentrations gives the permissible operating range as far as acid concentration is concerned. This difference is quite large at 250° C. and is zero at 350° C.

A consideration of the formation of zinc sulfide by precipitation with hydrogen sulfide shows that the acid concentration increases as the precipitation progresses:

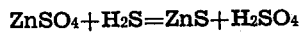
$$ZnSO_4 + H_2S = ZnS + H_2SO_4$$

For example, a 2% solution of zinc sulfate heptahydrate containing 2.5% free sulfuric acid, will after complete precipitation contain just under 2.7% free sulfuric acid. In the direct precipitation of wurtzite this increase in free acid must be taken into account, especially when operating in the upper portion of the previously mentioned temperature range where the difference between the maximum and minimum permissible acid concentrations is small and especially when concentrated zinc sulfate solutions, for example those containing 5% to 20% or more of zinc sulfate heptahydrate are being processed. On the other hand, at the high temperatures employed and in the presence of hydrogen sulfide some sulfuric acid is destroyed by reduction and the material lost in this way must also be considered when fixing the operating conditions. No more definite specifications as to operating conditions can be outlined for obvious reasons. The rate and amount of increase in free acid varies with the concentration of the zinc solution being precipitated, the rate of zinc sulfide precipitation and the completeness of said precipitation while the rate and amount of destruction of acid by reduction depends upon such factors as precipitating temperature, contact time, acid strength, size and shape of the precipitator and other factors. However, a specific example of satisfactory operating conditions will be given to further elucidate the process.

Example 12.—A zinc sulfate solution containing 3% free sulfuric acid is pumped through a coil under pressure and heated therein to a temperature of 250° C. The heated solution is then pumped to the top of the precipitator and is allowed to pass downward therethrough in the liquid phase. Hydrogen sulfide under pressure is passed into the bottom of the precipitator and allowed to pass upward through the descending solution, any excess gas being removed from the top of the precipitator. During its descent through the precipitator the solution is gradually and progressively heated so that the exit temperature of the wurtzite slurry is 325° C., the free acid concentration being about 4.3%. The increase in acid concentration is brought about by the precipitation reaction and by the addition of sulfuric acid in small controlled amounts to the precipitator at a plurality of points. The amount of acid added depends, among other factors, upon the concentration of the zinc sulfate solution being precipitated. With a 2% zinc sulfate heptahydrate solution practically all of the increase in acid must be supplied from an outside source or even an amount greater than the calculated difference between the final and initial concentrations if reduction has been severe. With a 15% zinc sulfate heptahydrate solution on the other hand, little additional acid need be supplied, the increased acid being formed autogeneously. With highly concentrated zinc sulfate heptahydrate it may be even necessary to neutralize part of the acid formed during the precipitation reaction. The resulting wurtzite slurry is cooled and after pressure reduction is passed to a separator, hydrogen sulfide being taken overhead and the slurry being removed as bottoms. On filtering and washing the slurry pure wurtzite is obtained. This wurtzite may be treated with a solution containing the appropriate quantity of a compound of an activating element and then dried to form the phosphor. If desired, the dried material may be mixed with a colorless flux and calcined.

If desired, the proper amount of a compound of an activating element may be added in the appropriate amount to the zinc sulfate solution prior to precipitation and the two may be coprecipitated.

It is possible to convert amorphous zinc sulfide or sphalerite formed by precipitation at ordinary temperatures into wurtzite by heating the former varities under pressure in the presence of dilute sulfuric acid, preferably acid saturated with hydrogen sulfide. Here also the previously mentioned permissible maximum and minimum acid concentrations obtain. In this reaction sulfuric acid is destroyed both by reduction and by the reaction: $ZnS+H_2SO_4=ZnSO_4+H_2S$ which occurs to a greater or less extent depending on the temperature, acid concentration and other factors. This destruction of acid may be compensated for by the gradual addition of acid during treatment.

*Example 13.*—A filter cake consisting of zinc sulfide precipitated at ordinary temperatures is added to 4.3% sulfuric acid, preferably saturated with hydrogen sulfide. The resulting slurry is heated in an autoclave with stirring to a temperature of 325° C. The autoclave is allowed to cool slowly with stirring and from time to time sulfuric acid is added if necessary to keep the acid concentration between the limits set by the previously mentioned empirical equations. When the temperature reaches 250° C. the contents of the autoclave are quickly discharged through a cooler and after pressure reduction and separation of hydrogen sulfide the resulting solution is filtered and the precipitate is washed to give a cake of wurtzite. When a rich slurry is treated in accord with this example, acid must be added as described but with a thin slurry no acid need be added or, in some cases, a slight amount of neutralizing agent need be added during the cooling of the autoclave and its contents.

If desired, the original amorphous or sphaleritic zinc sulfide may contain the requisite amount of a compound of an activating element, or the requisite amount of a compound of the selected activating elements may be added to the sulfuric acid prior to the metamorphosis or the pure wurtzite resulting may be treated with a solution containing the proper amount of a compound of an activating element following which it is dried. If desired, the activated wurtzite may be mixed with a colorless flux and calcined.

It is evident that the equipment used in carrying out the reactions described in Examples 12 and 13 must be highly corrosion resistant.

While Examples 12 and 13 describe reactions occurring with an increasing and decreasing temperature respectively it is evident that this is done only to take advantage of the change in permissible acid concentration with temperature. If desired, the reactions may be allowed to proceed at constant temperature, say 300° C., provisions being made to keep the acid concentration within the narrow range of approximately 3% to 4%.

The filtrates obtained following the procedures of Examples 12 and 13 contain more or less zinc sulfate due to incomplete precipitation of wurtzite or to solution of zinc sulfide respectively. These filtrates may be brought up to the desired strength with zinc sulfate and recycled, the acid concentrations being adjusted if necessary. Also, more or less hydrogen sulfide is obtained from the wurtzite slurries resulting from the operations described in Examples 12 and 13. Also in Example 12 some hydrogen sulfide escapes from the top of the precipitator. All this gas may be recovered, if desired, by means well known in the art, and reused.

Although the present invention has been described in connection with details and specific examples thereof it is not intended that these shall be regarded as limitations upon the scope of the invention except insofar as included in the accompanying claims.

I claim:

1. In the process of preparing phosphors, the steps comprising forming a precipitate of hydrated alumina in a solution containing a compound of zinc, removing the resulting insoluble material from said solution and chemically combining said zinc cation with a phosphor base anion.

2. The process of preparing zinc sulfide comprising forming a precipitate of hydrated alumina in a solution containing a compound of zinc, removing the resulting insoluble material from said solution and chemically combining said zinc cation with the sulfide anion.

3. The process of preparing zinc sulfide comprising forming a precipitate of hydrated alumina in a solution containing a compound of zinc, removing the resulting insoluble material from said solution and treating said solution with a soluble sulfide at elevated temperatures in the presence of dilute acid.

4. The process of preparing zinc sulfide comprising forming a precipitate of hydrated alumina in a solution containing a compound of zinc, removing the resulting insoluble material from said solution, treating said solution with a soluble sulfide in the temperature range 250° C. to 350° C. in the presence of dilute sulfuric acid, the percentage of said sulfuric acid being maintained below a value defined by the expression $0.0225t-2.75$ and above a value defined by the expression $0.04t-8.8$ wherein $t$ represents the temperature in degrees centigrade of said treatment.

5. The process of preparing zinc sulfide comprising forming a precipitate of hydrated alumina in a solution containing a compound of zinc, removing the resulting insoluble material from said solution, chemically combining said zinc cation with the sulfide anion and metamorphosing the resulting zinc sulfide at elevated temperatures in the presence of dilute acid.

6. The process of preparing zinc sulfide comprising forming a precipitate of hydrated alumina in a solution containing a compound of zinc, removing the resulting insoluble material from said solution, chemically combining said zinc cation with the sulfide anion and metamorphosing the resulting zinc sulfide in the temperature range 250° C. to 350° C. in the presence of dilute sulfuric acid, the percentage of said sulfuric acid being maintained below a value defined by the expression $0.0225t-2.75$ and above a value defined by the expression $0.04t-8.8$ wherein $t$ represents the temperature in degrees centigrade of said metamorphosis.

7. The process according to claim 6 wherein said dilute sulfuric acid contains a soluble sulfide.

8. In the process of preparing phosphors, the steps comprising forming, in the presence of a soluble sulfide in an amount less than that stoichiometrically equivalent to the hereinafter mentioned compound of zinc, a precipitate of hydrated alumina in a solution containing a compound of zinc, removing the resulting insoluble material from said solution and chemically combining said zinc cation with a phosphor base anion.

9. The process of preparing zinc sulfide comprising forming, in the presence of a soluble sulfide in an amount less than that stoichiometrically equivalent to the hereinafter mentioned compound of zinc, a precipitate of hydrated alumina in a solution containing a compound of zinc, removing the resulting insoluble material from said solution and chemically combining said zinc cation with the sulfide anion.

10. The process of preparing zinc sulfide comprising forming, in the presence of a soluble sulfide in an amount less than that stoichiometrically equivalent to the hereinafter mentioned compound of zinc, a precipitate of hydrated alumina in a solution containing a compound of zinc, removing the resulting insoluble material from said solution and treating said solution with a soluble sulfide at elevated temperatures in the presence of dilute acid.

11. The process of preparing zinc sulfide comprising forming, in the presence of a soluble sulfide in an amount less than that stoichiometrically equivalent to the hereinafter mentioned compound of zinc, a precipitate of hydrated alumina in a solution containing a compound of zinc, removing the resulting insoluble material from said solution, treating said solution with a soluble sulfide in the temperature range 250° C. to 350° C. in the presence of dilute sulfuric acid, the percentage of said sulfuric acid being maintained below a value defined by the expression $0.0225t-2.75$ and above a value defined by the expression $0.04t-8.8$ wherein $t$ represents the temperature in degrees centigrade of said treatment.

12. The process of preparing zinc sulfide comprising forming, in the presence of a soluble sulfide in an amount less than that stoichiometrically equivalent to the hereinafter mentioned compound of zinc, a precipitate of hydrated alumina in a solution containing a compound of zinc, removing the resulting insoluble material from said solution, chemically combining said zinc cation with the sulfide anion and metamorphosing the resulting zinc sulfide at elevated temperatures in the presence of dilute acid.

13. The process of preparing zinc sulfide comprising forming, in the presence of a soluble sulfide in an amount less than that stoichiometrically equivalent to the hereinafter mentioned compound of zinc, a precipitate of hydrated alumina in a solution containing a compound of zinc, removing the resulting insoluble material from said solution, chemically combining said zinc cation with the sulfide anion and metamorphosing the resulting zinc sulfide in the temperature range 250° C. to 350° C. in the presence of dilute sulfuric acid, the percentage of said acid being maintained below a value defined by the expression $0.0225t-2.75$ and above a value defined by the expression $0.04t-8.8$ wherein $t$ represents the temperature in degrees centigrade of said metamorphosis.

14. The process according to claim 13 wherein said dilute sulfuric acid contains a soluble sulfide.

15. The process according to claim 5 wherein said dilute acid contains a soluble sulfide.

16. The process according to claim 12 wherein said dilute acid contains a soluble sulfide.

ROBERT F. RUTHRUFF.